United States Patent [19]

Erickson et al.

[11] Patent Number: 5,837,749

[45] Date of Patent: Nov. 17, 1998

[54] NON-AQUEOUS SOLVENT FREE PROCESS FOR MAKING UV CURABLE ADHESIVES AND SEALANTS FROM EPOXIDIZED MONOHYDROXYLATED DIENE POLYMERS (III)

[75] Inventors: James Robert Erickson, Katy, Tex.; James Crivello, Clifton Park, N.Y.

[73] Assignee: Shell Oil Company, Houston, Tex.

[21] Appl. No.: 839,700

[22] Filed: Apr. 15, 1997

Related U.S. Application Data

[60] Provisional application No. 60/017,045 Apr. 26, 1996.

[51] Int. Cl.$^6$ .............................. C08L 53/00; C08L 63/08
[52] U.S. Cl. ........................... 522/31; 522/111; 522/162; 525/93; 525/97; 525/98; 525/99
[58] Field of Search .............................. 522/31, 111, 112, 522/110, 109; 525/93, 97, 98, 99

[56] References Cited

U.S. PATENT DOCUMENTS

| | | | |
|---|---|---|---|
| 4,910,261 | 3/1990 | Kaszas et al. | 522/126 |
| 4,985,471 | 1/1991 | Ohta et al. | 522/182 |
| 5,079,378 | 1/1992 | Crivello | 556/64 |
| 5,229,464 | 7/1993 | Erickson et al. | 525/314 |
| 5,247,026 | 9/1993 | Erickson et al. | 525/331.9 |
| 5,393,818 | 2/1995 | Masse et al. | 524/270 |
| 5,500,481 | 3/1996 | St. Clair | 525/92 K |
| 5,536,772 | 7/1996 | Dillman et al. | 522/111 |

FOREIGN PATENT DOCUMENTS

| | | | |
|---|---|---|---|
| WO 93/24547 | 6/1993 | WIPO | C08F 297/04 |

Primary Examiner—Susan W. Berman
Attorney, Agent, or Firm—Donald F. Haas

[57] ABSTRACT

The invention herein is curable adhesive and sealant compositions and a non-aqueous solvent free process for producing such compositions which comprise a mono-ol, tackifying resin, and a monohydroxylated epoxidized polydiene polymer which is comprised of at least two polymerizable ethylenically unsaturated hydrocarbon monomers wherein at least one is a diene monomer which yields unsaturation suitable for epoxidation and wherein the polymer contains from 0.1 to 7.0 milliequivalents of epoxy per gram of polymer. The process involves mixing the components together with a photoinitiator which is selected from the group consisting of diaryl, especially diaryliodonium, salts characterized by the general formula:

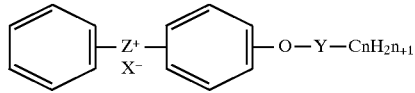

where Y is

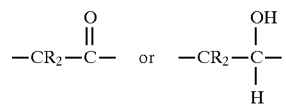

where R is hydrogen, aryl, alkyl, or an alkylhalide; n is an integer of at least 1, Z is I, Cl, or Br, preferably I, and X is a complex metal halide anion or a complex halide anion of a strong protonic acid.

20 Claims, No Drawings

NON-AQUEOUS SOLVENT FREE PROCESS FOR MAKING UV CURABLE ADHESIVES AND SEALANTS FROM EPOXIDIZED MONOHYDROXYLATED DIENE POLYMERS (III)

CROSSREFERENCE TO RELATED APPLICATIONS

This application claims the benefit of U.S. Provisional Application No. 60/017,045, filed Apr. 26, 1996.

BACKGROUND OF THE INVENTION

This invention relates to a new process for making adhesives, sealants, coatings, and other types of films, fibers, or thin parts made from epoxidized monohydroxylated diene polymers. More specifically, the invention relates to a non-aqueous solvent free process for making UV curable compositions from epoxidized monohydroxylated polydiene polymers which does not require the use of intensive mixing equipment or any special processing techniques. This invention also relates to radiation curable adhesive, sealant, and coating compositions.

The use of novel epoxidized monohydroxylated polydienes in UV curable adhesive and sealants compositions is described in copending commonly assigned U.S. patent application Ser. No. 08/320,804, filed Oct. 11, 1994. The polymers are combined with other ingredients such as a tackifying resin to make them suitable for adhesive and sealant products. A photoinitiator is included in the combination to promote the UV curing (crosslinking) of the composition. As described in the examples of the aforesaid patent application, the components were dispersed in a non-aqueous solvent, usually THF, and then adhesive films were cast from the solution. The non-aqueous solvent was necessary because difficulties were encountered in mixing the photoinitiator (triarylsulfonium hexafluoroantimonate) into the adhesive mixture because it was not readily compatible and would not dissolve or finely disperse. The THF was necessary to obtain effective UV curing—the curing was ineffective in the absence of the non-aqueous solvent.

For many applications, the use of non-aqueous solvents is undesirable because of environmental hazards and the cost of non-aqueous solvent removal and the non-aqueous solvent itself. One possible method for solving this problem is a non-aqueous solvent free method for mixing these components which requires the use of intensive mixing for dispersing the photoinitiator so that an effectively cured adhesive, sealant, or other composition is prepared. The present invention achieves the same results for making thin films without the necessity for high shear equipment.

SUMMARY OF THE INVENTION

This invention is UV curable adhesive, sealant, coating, or other compositions and a method for making such compositions from a epoxidized monohydroxylated polydiene polymer comprised of at least two polymerizable ethylenically unsaturated hydrocarbon monomers wherein at least one is a diene monomer which yields unsaturation suitable for epoxidation is used as the binder for the composition. The preferred epoxidized monohydroxylated polymers are block copolymers of at least two conjugated dienes, preferably isoprene and butadiene, and optionally, a vinyl aromatic hydrocarbon wherein a hydroxyl group is attached at one end of the polymer molecule. These polymers may be hydrogenated or unsaturated. The present process involves incorporating into this composition a photoinitiator which is soluble or readily dispersible in the formulation, for example, a diaryliodonium hexafluoroantimonate which has a long chain alkyl group in the ester linkage, to overcome the difficulty in mixing the prior art photoinitiator with the adhesive formulation. When mixed into the adhesive formulation in an amount from 0.01 to 10% by weight of the total composition, preferably 0.1 to 10%, more preferably 0.1 to 1.0%, most preferably 0.1 to 0.3%, the photoinitiator of this invention is soluble or readily dispersible in the polymer blend and very good curing with UV radiation is the result.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, preferably lithium, their alkyls, amides, napthalides, biphenyls or anthracenyl derivatives. The monohydroxylated polydienes are synthesized by anionic polymerization of conjugated diene hydrocarbons with these lithium initiators. This process is well known as described in U.S. Pat. No. 4,039,593 and Re. 27,145 which descriptions are incorporated herein by reference. Polymerization commences with a monolithium initiator which builds a living polymer backbone at each lithium site. Typically, such polymerizations are capped by termination with ethylene oxide to provide a terminal hydroxyl group. Specific processes for making these polymers are described in detail in copending, commonly assigned application Ser. No. 08/320, 807, "Monohydroxylated Diene Polymers and Epoxidized Derivatives Thereof", filed Oct. 11, 1994, which is herein incorporated by reference.

Conjugated diolefins which may be polymerized anionically include those conjugated diolefins containing from about 4 to about 24 carbon atoms such as 1,3-butadiene, isoprene, piperylene, methylpentadiene, 2-phenyl-1,3-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The most preferred monohydroxylated polydiene polymer of the present invention has the structural formula $$(HO)_x\text{---}A\text{---}S_z\text{---}B\text{---}(OH)_y \tag{I}$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a number average molecular weight of from 100 to 6000 g/mol, preferably 500 to 4,000 g/mol, and most preferably 1000 to 3000 g/mol, and the B blocks have a number average molecular weight of from 1000 to 15,000 g/mol, preferably 2000 to 10,000 g/mol, and most preferably 3000 to 6000 g/mol. S is a vinyl aromatic hydrocarbon block which may have a number average molecular weight of from 100 to 10,000. x and y are 0 or 1. Either x or y must be 1, but only one at a time can be 1. z is 0 or 1. Either the A or the B block may be capped with a miniblock of polymer, 50 to 1000 number average molecular weight, of a different composition, to compensate for any initiation, tapering due to unfavorable copolymerization rates, or capping difficulties. These monhydroxylated polydiene polymers may be epoxidized such that they contain from 0.1 to 7.0 milliequivalents (meq) of epoxide functionality (oxirane oxygen) per gram of polymer.

Diblocks falling within the above description are preferred. The overall number average molecular weight of such diblocks may range from 1500 to 15000 g/mol, preferably 3000 to 7000 g/mol. Either of the blocks in the diblock may contain some randomly polymerized vinyl aromatic hydrocarbon as described above. For example, where I represents isoprene, B represents butadiene, S represents styrene, and a slash (/) represents a random copolymer block, the diblocks may have the following structures:

I—B—OH I—B/S—OH I/S—B—OH I—I/B—OH or

B/I—B/S—OH B—B/S—OH I—EB—OH I—EB/S—OH or

I—S/EB—OH I/S—EB—OH HO—I—S/B HO—I—S/EB where EB is hydrogenated butadiene, —EB/S—OH means that the hydroxyl source is attached to a styrene repeating unit, and —S/EB—OH signifies that the hydroxyl source is attached to a hydrogenated butadiene repeating unit. This latter case, —S/EB—OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer. However, the hydroxyl may also be attached to the isoprene block if desired. This produces a more surfactant-like molecule with less load bearing capacity. The isoprene blocks may also be hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

I—EB/S—EB—OH I—B/S—B—OH I—S—EB—OH I—S—B—OH or

I—I/S—I—OH I—S—I—OH B—S—B—OH B—B/S—B—OH or

I—B/S—I—OH I—EB/S—I—OH or

I—B—S—OH I—EB—S—OH HO—I—EB—S

The latter group of polymers specified in the last line above wherein the styrene block is external are represented by the formula $$(HO)_x\text{—A—B—S—}(OH)_y \qquad (II)$$

where A, B, S, x, and y are as described above. These polymers and the other triblocks shown above are particularly advantageous for introducing blocks of epoxy functionality into the monohydroxylated polymers at multiple sites.

Epoxidation of the base polymer can be effected by reaction with organic peracids which can be preformed or formed in situ. Suitable preformed peracids include peracetic, performic, and perbenzoic acids. In situ formation may be accomplished by using hydrogen peroxide and a low molecular weight fatty acid such as formic acid. These and other methods are described in more detail in U.S. Pat. Nos. 5,229,464 and 5,247,026 which are herein incorporated by reference. Alternately, tungsten catalyzed phase transfer epoxidation can be carried out as described in J. Polymer Science, Pt A, 33 1881 (1995) by J. V. Crivello and B. Yang. The amount of epoxidation of these polydiene polymers ranges from about 0.1 to about 7 milliequivalents of oxirane oxygen per gram of polymer, Low levels are desirable to avoid overcure. Above 7 meq/g, the rigidity, crosslink density, cost, difficulty of manufacture, and polarity of the epoxidized are such that polymer does not provide any benefit. The preferred amount of epoxidation is about 0.5 to about 5 meq/g and the most preferred amount of epoxidation is about 1.0 to 3 meq/g. The most preferred amount provides the best balance of rate of UV cure against undesired overcure and better maintains compatibility with a variety of formulating ingredients commonly used with polydiene based adhesives.

The molecular weights of the linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the most abundant species shown on the chromatograph. For polydisperse polymers the number average and the weight average molecular weight should be calculated from the chromatograph and used. For materials to be used in the columns of the GPC, styrene-divinylbenzene gels or silica gels are commonly used and give excellent molecular weight results. Tetrahydrofuran is an excellent non-aqueous solvent for polymers of the type described herein. A refractive index detector may be used. For anionic polymers, it is also often convenient to determine the number average molecular weight by end group analysis using NMR.

If desired, these block copolymers can be partially hydrogenated. Hydrogenation may be effected selectively as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference. Partially unsaturated hydroxylated polymers are useful for further functionalization to make the epoxidized polymers of this invention. The partial unsaturation preferably is such that 0.1 to 7 meq of aliphatic double bonds suitable for epoxidation remain on the polymer. If epoxidation is carried out before hydrogenation, then it is preferred that all remaining aliphatic double bonds be hydrogenated.

It is highly advantageous to include in the composition a low molecular weight polydiene mono-ol in order to improve the tack of the adhesive. Such mono-ols have a number average molecular weight of 2000 to 30,000 g/mol and are preferably hydrogenated polydiene polymers with a terminal OH, such as monohydroxylated hydrogenated polybutadiene or polyisoprene. Preferred mono-ols include those with a number average molecular weight range of 2000 to 10,000 g/mol.

The binders of this invention may be cured by cationic means using acid catalysts but are preferably cured by means of ultraviolet or electron beam radiation. Radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used. A complete description of how this irradiation may be accomplished is found in commonly assigned U.S. Pat. No. 5,229,464 which is herein incorporated by reference.

When using non-ionizing radiation it is necessary to employ a photoinitiator to initiate the crosslinking reaction. In this invention, the photoinitiator is one which is very compatible with the composition, preferably soluble in it. It is used in an amount of from 0.01 to 10% by weight of the total composition, preferably 0.1 to 10%, more preferably 0.1 to 1.0%, most preferably 0.1 to 0.3%. Useful photoinitiators include those described in U.S. Pat. No. 5,079,378 which is herein incorporated by reference. These photoinitiators may be described as diaryl, preferably diaryliodonium, salts characterized by the general formula:

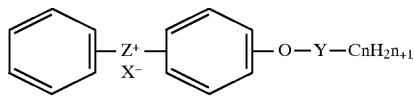

where Y is

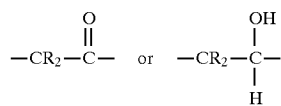

where R is hydrogen, aryl, alkyl, or an alkylhalide; n is an integer of at least 1, Z is I, Cl, or Br, preferably I, and X is a complex metal halide anion or a complex halide anion of a strong protonic acid. Included are complex metal halide anions such as $BF_4^-$, $PF_6^-$, $AsF_6^-$, $SbF_6^-$, as well as anions of strong protonic acids such as $ClO_4^-$, $CF_3SO_3^-$, $FSO_3^-$, $CH_3SO_3^-$, and $C_4F_9SO_3^-$. Especially useful is another similar compound, CD-1012 supplied by the Sartomer Company. This is a diaryliodonium hexafluoroantimonate and has the formula:

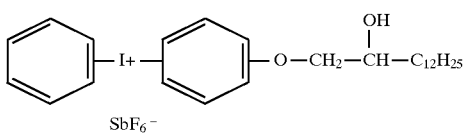

As described in the examples of copending, commonly assigned U.S. patent application Ser. No. 08/320,804, filed Oct. 11, 1994, a photoinitiator can be dispersed in a non-aqueous solvent along with the polymer and the tackifying resin in order to provide a composition which is effectively radiation curable. The present process accomplishes this without the use of a non-aqueous solvent. No solvent is necessary because the photoinitiator is very compatible with and unusually soluble or spontaneously dispersible in the polymer blend. Excellent cured films can be made according to the present invention without the trouble and expense of special processing techniques.

Radiation induced cationic curing may also be carried out in combination with free radical curing. Free radical curing can be further enhanced by the addition of additional free radical photoinitiators and photosensitizers.

The materials of the process of the present invention are useful in pressure sensitive adhesives, sealants, (including packaging adhesives, contact adhesives, laminating adhesives, weatherable tapes transfer and mounting tapes structural adhesives, automotive adhesives, and assembly adhesives), coatings, inks, labels, and printing plate and film applications. It may be necessary for a formulator to combine a variety of ingredients together with the polymers of the present invention in order to obtain products having the proper combination of properties (such as adhesion, cohesion, durability, low cost, etc.) for particular applications. In most of these applications, suitable formulations would also contain various combinations of resins, plasticizers, fillers, pigments, reactive diluents, oligomers, and polymers, non-aqueous solvents, stabilizers and other ingredients such as asphalt.

It is common practice to add an adhesion promoting or taclifying resin that is compatible with the polymer, generally from 20 to 400 parts per hundred parts of polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of a mixture containing appoximately 60% piperylene, 10% isoprene, 5% cyclo-pentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 20° C. and 150° C. Hydrogenated hydrocarbon resins are especially useful. These hydrogenated resins include such resins as Regalrez® 1018, 1085, 1094, 1126, and 1139, and Regalite® R91, R101, R125, and T140 supplied by Hercules, Arkon® P70, P90, P115, P125 supplied by Arakawa, and similar other resins such as the Escorez® 5300 resin series supplied by Exxon.

Aromatic resins may also be employed as tackifying agents, provided that they are compatible with the particular polymer used in the formulation. Useful resins include coumaroneindene resins, polystyrene resins, vinyl toluene-alpha methylstyrene copolymers and polyindene resins.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Adhesives are frequently thin layers of tacky compositions which are used in protected environments (adhering two substrates together). Therefore, unsaturated epoxidized polymers will often have adequate stability so resin type and concentration will be selected for maximum tackiness without great concern for oxidation or photostability, and pigments will usually not be used. However, for high performance adhesives, hydrogenated epoxidized polymers will be used, often in conjunction with hydrogenated tackifying resins.

Sealants are gap fillers. Therefore, they are used in fairly thick layers to fill the space between two substrates. Since the two substrates frequently move relative to each other, sealants are usually low modulus compositions capable of withstanding this movement. Because sealants are frequently exposed to the weather, the hydrogenated epoxidized polymers are usually used to provide adequate stabiltiy to the environment. Resins and plasticizers will be selected to maintain low modulus and minimize dirt pick-up. Fillers and pigments will be selected to give appropriate durability and color. Since sealants are applied in fairly thick layers, their nonaqueous solvent content should be as low as possible to minimize shrinkage.

EXAMPLES

In the following examples several adhesive tests are used to demonstrate the properties of test formulations using the improved process and composition of this invention. The degree of covalent cure obtained for each of the adhesive samples was measured by use of a polymer gel content test developed by J. R. Erickson for radiation curing adhesives, and first described in the article "Experimental Thermoplastic Rubbers for Enhanced Radiation Crosslinking of Hot Melt PSA's", TAPPI 1985 Hot Melt Symposium Proceedings, June 1985. The method as practiced for the present examples is essentially identical to the method as published, but for a few minor improvements and corrections to the method as first published. 180° Peel from polished stainless steel was determined using Pressure Sensitive Tape Council Method No. 1, measured in pounds per linear inch (pli). A 30 or 60 minute dwell time was used to assure good wetting before the peel was executed. The peel rate was 12 inches per minute. Large values indicate high strength when peeling a test tape from the substrate. Loop Tack (LT) was determined using a TLMI Loop Tack Tester. Polyken Probe Tack (PPT) was determined by ASTM D2979. High values for LT and PPT indicate aggressive tack. Holding Power (HP) is the time required to pull a standard area (1 in×1 in) of tape from a standard test surface under a standard load in 2° antipeel (Pressure Sensitive Tape Council Method No. 7), at a certain temperature. Long times indicate high adhesive and cohesive strength. Shear Adhesion Failure Test (SAFT) is similar to HP, except that the temperature at which failure occurs is recorded. SAFT is carried out in a oven that ramps up at a rate of 40° F. per hour. High temperature values indicate high cohesive and adhesive strength.

The Polymer 1 used in the first example is an epoxidized linear monohydroxy diene polymer with a number average molecular weight of 5500. The polymer is a diblock polymer where the first block consists of hydrogenated epoxidized polyisoprene and the second block is hydrogenated polybutadiene. The second block has a terminal primary hydroxyl group. The number average molecular weight ratio between the second block and the first block was 2/1. The polymer has 1.4 meq of epoxide functionality per gram, and 0.17 meq of hydroxyl groups per gram. Polymer 2 is a linear monohydroxy diene polymer with a number average molecular weight of 3950 and 0.25 meq/g of hydroxyl functionality. The mono-ol has a terminal primary hydroxyl group. The compatible photoinitiator discussed above was used. It is a diaryliodonium hexafluoroantimonate having a $C_{12}H_{25}$ alkyl group attached. The tackifier is Regalrez® 1085, a hydrogenated tackifying resin made by Hercules. A conventional amount of the antioxidant Irganox® 1010 is included.

Example 1

Previous adhesives comprised of epoxidized polydiene mono-ol polymer, polydiene mono-ol polymer, Regalrez 1085®, and the incompatible photoinitiator UVI-6974 would not UV cure unless mixed together with tetrahydrofuran (THF). Without the THF, the relatively dense photoinitiator would phase separate in the adhesive and fall to the bottom of the container where it could be easily seen by the unaided eye as an insoluble bead or beads of material. The lack of effective UV cure was evident by lack of cohesion of the adhesive. Essentially the adhesive remained a viscous liquid (goo) and when one tried a finger tack test, adhesive would simply transfer to the finger. This performance after UV exposure is totally unacceptable. The perceived role of the THF was to dissolve the photoinitiator and evaporate after the adhesive film was applied, thereby leaving the photoinitiator finely dispersed in the dry adhesive film. The film could then be successfully UV cured. Alternatively, the photoinitiator could be directly dispersed into the adhesive, in the absence of a non-aqueous solvent, by using very high shear mixing or sonication, and then be successfully UV cured.

To determine the effectiveness of CD-1012 as an friendlier alternative photoinitiator, a plan was implemented using the pressure sensitive adhesive (PSA) formulation shown in Table 1A. The plan called for making the PSA of Table 1A using only simple low shear mixing equipment without a non-aqueous solvent, then evaluating the PSA at 5 and 20 mils thickness, at two film temperatures during irradiation, and determining the 96 hour melt stability at 93° C. (200° F.). These evaluation treatments are summarized in Table 1B. Treatment A is the control treatment against which the other three treatments are compared.

TABLE 1A

| PSA Formulation | |
|---|---|
| Ingredients | wt. % |
| Polymer 1 | 24.4 |
| Polymer 2 | 25.4 |
| Regalrez ® 1085 (Hercules) | 49.8 |
| CD-1012 (Sartomer) | 0.25 |
| Irganox ® 1010 (Ciba) | 0.15 |

TABLE 1B

Treatment Summary

| Treatment | A | B | C | D |
|---|---|---|---|---|
| Film Thickness, mil | 5 | 20 | 5 | 5 |
| Film temperature during irradiation, °C. | 121 | 121 | 93 | 121 |
| 96 hour melt aging temperature, °C. | 23 | 23 | 23 | 93 |

The adhesive (400 g batch) was prepared according to the formula in Table 1A using the following procedure. All of the ingredients, except for the photoinitiator, CD-1012, were added to a stainless steel beaker, and heated in a 135° C. oven for one hour. The beaker was removed and placed onto a cold hot plate and the ingredients were mixed at medium speed with a four-fin paddle stirrer until the temperature dropped to 93° C. The photoinitiator was added and mixing was continued for 30 minutes using the hot plate to maintain the temperature at 93° C. The PSA appeared clear upon microscopic examination in bright field at 500 magnification.

The hot PSA was divided into two aliquots. The first aliquot consisted of 100 grams poured into a 200 ml tall form Pyrex beaker. The beaker was covered with aluminum foil and placed into an air oven at 93° C., for 96 hours. The remaining aliquot in the steel beaker was covered with foil and held at room temperature for 96 hours. The viscosity profile of each aliquot after the 96 hour aging was obtained using a Bolin Rheometer.

Using a 93° C. application temperature and a hand applicator, portions of the room temperature and the 93° C. aged PSA aliquots were cast onto one mil polyester film to give either approx. 5 or 20 mils of adhesive. Two castings were made for each of the four treatments (A–D). The test films were placed in a 93° or 121° C. oven for 2 minutes, removed, and immediately irradiated using a Fussion Lab Coater operating with one "H" bulb. Irradiation was carried out with the adhesive facing the incident light. The conveyor speed (43 meters per minute) was selected to yield a dose of 125 mJ/cm$^2$, as measured on a Lightbug radiometer.

All of the samples except those of treatment B cured instantly to the touch. All testing, except for gel on B, was started after the irradiated test films had aged at room temperature for approximately 24 hours in the dark. Gel content testing on B was started about 48 hours after irradiation. Test specimens were taken from both castings for replicate testing. The actual cured film thickness was determined on each casting using a micrometer. All of the films appeared clear to the eye both before and after curing.

Table 1C shows the mean values obtained for each of the tests, and the 95% confidence limits on the means. The 95% confidence limits associated with the mean values were calculated using the expermiental error associated with the available test observations.

TABLE 1C

PSA Test Results, Mean Values

|  | Treatment | | | | Number of | 95% Confidence |
|---|---|---|---|---|---|---|
|  | A | B | C | D | replicates | limits on means |
| Measured adhesive film thickness, mil | 4.50 | 17.7 | 4.40 | 4.45 | 2 | ±0.21* |
| Examination for through cure | through cure | surface cure | through cure | through cure | 2 | — |
| Polymer gel content, % | 88.0 | 60.5** | 90.0 | 86.0 | 2 | ±1.6 |
| Rolling ball Tack, cm | 3.16 | — | 3.36 | 2.30 | 5 | ±0.20 |
| Polyken Probe Tack, Kg | 1.16 | — | 0.95 | 1.34 | 5 | ±0.23 |
| TLMI loop Tack, oz/in | 71.3 | — | 82.7 | 82.7 | 3 | ±12.1 |
| 180° Peel from steel, pli | 3.90 | — | 4.45 | 4.30 | 2 | ±0.83 |
| 23° C. Holding power to steel, 1 in$^2$ * 2 Kg, hour | >648 | — | >648# | >648# | 2 | ±0 |
| Shear adhesion failure temperature (SAFT) to Mylar, 1 in$^2$ * 500 g, °C. | >143 | — | >130 | >157# | 3 | ±46 |
| 95° C. Holding power to Mylar, 1 in$^2$ * 500 g, hour | >71 | — | >71 | >71 | 2 | ±0 |

*This confidence interval does not apply to treatment B. The upper cured layer of the film was floating on an uncured liquid layer, making the micrometer measurements less reliable.
**The gel value shown for B represents the average obtained from including both the cured surface layer and the uncured bottom layer. Treatment B films could not be tested using standard PSA performance tests because of the uncured liquid adhesive at the polyester interface.
One of the replicates was an statistical outlier, and was dropped. The confidence limits for the mean value of SAFT for treatment D is ±56.

Treatment B obviously differs significantly from the other three treatments. The concentration of the CD-1012 photoinitiator was too great or the UV light intensity was too low to adequately cure a 17.7 mil film. The top layer of the film cured while the bottom layer remained as an uncured liquid. Because the cured layer was "floating" on the liquid layer, it was impossible to run any quantitative test except for polymer gel content. The 60.5% gel content observed indicates that the cured surface layer was roughly 12 mils thick 48 hours after irradiation.

The PSA formulation tested under the control conditions (treatment A) gave excellent performance results. It had excellent gel formation, aggressive tack, peel, holding power, and SAFT values. Treatment C, carried out at a 93° C. film temperature during irradiation, gave the same excellent results. Treatment D, simulating 96 hours in a holding tank at 93° C., also gave the excellent results like A, except that D had a slightly better rolling ball tack. The viscosity profiles show that holding the uncured adhesive for 96 hours at 93° C. caused very little thermally induced reaction since the viscosity only rose about 50% compared to the adhesive held at room temperature.

The data presented in this example shows that excellent PSA properties can be obtained using the CD-1012 photoinitiator in UV cured epoxidized monohydroxylated diene polymer/diene mono-ol based adhesives. The CD-1012 photoinitiator easily mixes into the formulation. Five mil films were easily cured, but curing much thicker films is more difficult. Using a 93° C. film temperature during irradiation produces cures which perform as well as those made using a higher temperature. Lower film temperatures are expected to work as well. Melt stability at 93° C. is good, indicating there is no problem with the pot life of the adhesive in a holding tank of a production unit operating at this temperature. Curing and film properties are unaffected by this treatment. 93° C. is believed to be a higher temperature than needed for commercial application.

If the adhesive is applied with a commercial coater at temperatures in the range of 40° to 80° C., the film temperature could be raised to 93° C., if desired, by passing it over a hot roll immediately before irradiation. Alternatively, heating could be achieved by other means, such as through the use of infrared heaters. However, it should be noted that it could be disadvantageous to not allow the irradiated adhesive to cool to room temperature immediately after the irradiation step. Treatment A was repeated, except that the adhesive was not allowed to cool from 93° C. (by placing it in a 93° C. oven) to room temperature for 24 hours after irradiation, and a lower polymer gel content (71%) was obtained.

Example 2

PSA's E, F, G, H, and I (Table 2A) are examples of the present invention. They were also prepared using a simple stirrer. PSA's J, K, and L are not examples of the invention and were prepared using a Branson 450 Sonifier. Polymer 3 (in Table 2A) is identical to Polymer 1 except that its number average molecular weight is 6070 and it has 1.6 meq of epoxide functionality per gram. Polymer 4 (in Table 2A) is identical to Polymer 2 except that its number average molecular weight is 3900.

step converts the crude polymers/tackifying resin mixture into a fluid, homogeneous mixture. Half of the required CD-1012 was added and each of the partial formulations was slowly stirred for about 15 minutes until the CD-1012 appeared dissolved. The remainder of the required CD-1012 was added and complete formulations were stirred for an additional 30 minutes while holding the temperature between 88° C. and 99° C. The 400 g batches were cooled to room temperature, covered with a lid, and used within one week.

To prepare 400 g batches of adhesives J, K, and L, the following procedure was followed. A 50 gram 5% wt UVI-6974 photoinitiator master batch in Polymer 4 was prepared by weighing 2.5 g of UVI-6974 and 47.5 g of Polymer 4 into a 4 oz bottle, heating for 30 minutes in a 121° C. oven, hand mixing, and finally sonicating with a Branson 450 Sonifier for two one minute periods with a cooling time of about 2 minutes between each period. The ingredients for adhesives J, K, and L, less photoinitiator and some of Polymer 4, were weighed into quart cans and each can was heated in a 149° C. oven for about one hour. Each can was then removed, hand stirred, and returned to the oven for another ½ hour. After the final removal from the oven, each partial formulation was mixed with a lab stirrer equipped with an impeller blade until the temperature cooled to about 93° C. Then 40 grams of the photoinitiator master match was added and stirring was continued for an additional 30 minutes while holding the batch temperature between 88° C. and 104° C. Upon completion of mixing, each batch was placed in a 121° C. oven to keep the material very fluid. One by one, 50 gram aliquots were poured into 4 oz bottles and sonicated for 1 to 1.5 minutes, and then transferred to a clean can where all of the aliquots for the particular batch were collected. Sonication was carried out using the Branson 450 Sonifier operating in continuous mode, such that power density was approximately 2.8 watts per ml of adhesive. The collected material was remixed with the lab stirrer for 5 minutes. The batches were cooled to room temperature, covered with a lid, and used within one week.

TABLE 2A

Pressure Sensitive Adhesives

| | PSA | | | | | | | |
|---|---|---|---|---|---|---|---|---|
| | E | F | G | H | I | J | K | L |
| Polymer 3 (epoxidized mono-ol) | 99.4 g | 99.4 | 99.4 | 99.4 | 99.4 | 99.4 | 99.4 | 99.4 |
| Polymer 4 (mono-ol) | 99.4 | 99.4 | 99.4 | 99.4 | 99.4 | 99.4 | 99.4 | 99.4 |
| Regalit ® R91 | 198.7 | — | — | — | — | 198.7 | — | — |
| Arkon ® P90 | — | 198.7 | — | — | — | — | 198.7 | — |
| Regalrez ® 1085 | — | — | 198.7 | — | — | — | — | — |
| Escore ® 5380 | — | — | — | 198.7 | — | — | — | — |
| Wingtack ® 95 | | | | | 198.7 | — | — | 198.7 |
| SarCat CD-1012 | 1.0 | 1.0 | 1.0 | 1.0 | 1.0 | — | — | — |
| Cyracure ® UVI-6974* | — | — | — | — | — | 2.0 | 2.0 | 2.0 |
| Irganox ® 1010 | 0.6 | 0.6 | 0.6 | 0.6 | 0.6 | 0.6 | 0.6 | 0.6 |

*UVI-6974 is 50% active. It consists of 50% mixed triarylsulfonium hexaflouroantimonate salts and 50% propylene carbonate.

All of the ingredients for adhesives E, F, G, H, and I except for the CD-1012 photoinitiator, were weighed into quart cans and each can was heated in a 149° C. oven for about one hour. Each can was removed, hand stirred, and returned to the oven for another ½ hour. Immediately upon final removal from the oven, each partial formulation was mixed with a lab stirrer equipped with an impeller blade until the temperature cooled to about 93° C. This mixing Adhesives E–L were coated using a ChemInstruments HLCL-1000 hot melt coater and laminator onto Akrosil SBL80SC Silox FIU/O thermal cure release liner to a thickness of 5 mils. The application temperature required was 49° C. Samples of each film were warmed for 2 minutes in a pre-heated oven, removed, and then immediately UV cured while still hot using an Eye Ultraviolet PL-1 portable benchtop UV curing unit. The UV dose was 180 mJ/cm$^2$, except for PSA I, which required a 400 mJ/cm$^2$ dose. The dose was determined by calibration with an EIT UVIMAP hand-held dosimeter supplied by Eye Ultraviolet. After curing, the adhesives were laminated to Pilcher Hamilton 2 mil untreated polyester film and allowed to age at room temperature for 5 to 15 days before testing.

Adhesives E, F, G, H, and I of the present invention were tested against Adhesives J, K, and L (those requiring sonication to disperse the photoinitiator), two solvent based acrylic adhesives, and two commercial transfer tapes. The commercial transfer tapes consisted of 5 mil thick adhesive self-wound on release liner. These tapes are believed to be acrylic tapes manufactured by solvent coating the acrylic compositions, drying, and curing. To test the commercial tapes, they were laminated to the 2 mil untreated polyester film. The test results, shown in Table 2B, indicate that overall, adhesives E, F, G, H, and I give properties as good as the adhesives made by the sonication method or as the acrylic adhesives or the commercial transfer tape adhesives.

39.8 grams of Polymer 5, and 0.25 grams of CD-1012 photoinitiator and mixing for 30 minutes at about 93° C. with a laboratory stirrer at medium speed. Polymer 5 is a hydrogenated polybutadiene diol polymer having a number average molecular eight of 3530 and having 0.53 meq of hydroxyl functionality per gram. The hydroxyl groups are primary and are terminally located, one on each end of the polymer. A portion of the coating was poured into a Petri dish to give a 20 mil film. The film was warmed back to 93° C. and then immediately irradiated with 250 mJ/cm$^2$ of dose delivered by single "H" bulb of a Fusion Lab Processor. Within 5 minutes the film was probed with a wood splint and found to be cured completely through to give a solid coating film. Another portion of the coating was poured into another Petri dish to give 50 mils of liquid coating, and it was heated and irradiated with 500 mJ/cm$^2$ of dose. It too immediately cured completely through to give a solid material.

Example 5

The pressure senitive adhesives shown in Table 5A were prepared by simple mixing according to the method of

TABLE 2B

Comparative Properties

| | PSA | | | | | | | | Acrylic | Acrylic | Com. | Com. |
|---|---|---|---|---|---|---|---|---|---|---|---|---|
| | E | F | G | H | I | J | K | L | 1 | 2 | tape 1 | tape 2 |
| Film temperature during irradiation, °C. | 50 | 93 | 93 | 93 | 93 | 93 | 93 | 93 | — | — | — | — |
| Polymer gel content, % | 95 | 93 | 84 | 87 | 79 | 91 | 90 | 90 | — | — | — | — |
| Rolling ball tack, cm | 6.3 | 6.8 | 5.4 | 1.4 | >14 | 7.5 | 5.4 | 13.5 | 5.1 | 3.9 | >12 | 16.7 |
| Loop tack, pli | 6.2 | 5.4 | 5.2 | 3.6 | 2.7 | 6.6 | 5.8 | 2.5 | 4.5 | 5.7 | 3.4 | 2.1 |
| Probe tack, Kg | 1.64 | 1.42 | 1.43 | 0.94 | 1.64 | 1.27 | 1.46 | 1.27 | 1.46 | 1.23 | 1.05 | 1.38 |
| 180° peel from stainless steel | 4.4 | 5.0 | 4.8 | 3.2 | 6.5 | 4.7 | 4.2 | 5.3 | 4.8 | 5.4 | 4.7 | 5.0 |
| 180° peel from glass | 4.5 | 3.9 | 4.2 | 3.0 | 5.4 | 4.4 | 4.1 | 5.4 | 7.1 | 6.4 | 5.3 | 5.7 |
| 180° peel from polymethyhmethacrylate | 4.6 | 4.4 | 4.5 | 3.1 | 6.3 | 4.4 | 4.0 | 5.3 | 5.9 | 5.2 | 4.2 | 4.6 |
| 180° peel from polycarbonate | 4.6 | 4.4 | 4.5 | 2.5 | 6.1 | 4.9 | 4.3 | 5.0 | 6.1 | 6.3 | 4.7 | 4.5 |
| 180° peel from high density polyethylene | 1.6 | 1.6 | 2.1 | 0.7 | 3.7 | 2.5 | 2.1 | 3.1 | 0.8 | 0.7 | 0.5 | 0.2 |
| 23° C. holding power to stainless steel, 1 in$^2$ * 2 Kg, hour | >112 | >112 | >112 | >100 | 71 | >112 | >112 | >112 | >113 | >113 | >112 | >112 |
| 95° C. holding power to stainless steel, 1 in$^2$ * 500 g, hour | >100 | >100 | >100 | >100 | — | >100 | >100 | >100 | 30 | — | >100 | >100 |
| Shear Adhesion Failure Temperature to stainless steel, 1 in$^2$ * 500 g, hour | >204 | >204 | >204 | >204 | 102 | >204 | >204 | 194 | 145 | >204 | >204 | >204 |

Example 3

A simple coating formulation is prepared by warming a mixture of 100 grams of Polymer 3 and 0.25 grams of CD-1012 photoinitiator and mixing for 30 minutes at about 93° C. with a laboratory stirrer at medium speed. A portion of the coating was poured into a Petri dish to give a 20 mil film. The film was warmed back to 93° C. and then immediately irradiated with 250 mJ/cm$^2$ of dose delivered by single "H" bulb of a Fusion Lab Processor. Within 5 minutes the film was probed with a wood splint and was found to be cured completely through to give a solid coating film. Another portion of the coating was poured into another Petri dish to give 50 mils of liquid coating, and it was heated and irradiated with 500 mJ/cm$^2$ of dose. It too immediately cured completely through to give a solid coating or thin part.

Example 4

A simple coating, printing plate, or fiber formulation was prepared by warming a mixture of 60.2 grams of Polymer 3, example 2. These adhesves use different relative ratios of epoxidized Polymer 3 to mono-ol Polymer 4, and use several levels of tackifier resin Regalite R91.

TABLE 5A

Pressure Senisitive Ahesives

| | RR1 wt. % | RR2 | RR3 | RR4 | RR5 | RR6 | RR7 | RR8 |
|---|---|---|---|---|---|---|---|---|
| Polymer 3 | 22.71 | 18.92 | 15.14 | 29.88 | 19.92 | 37.05 | 30.88 | 24.70 |
| Polymer 4 | 37.05 | 30.88 | 24.70 | 29.88 | 19.92 | 22.71 | 18.92 | 15.14 |
| Regalite ® R91 | 39.84 | 49.80 | 59.76 | 39.84 | 59.76 | 39.84 | 49.8 | 59.76 |
| SarCat CD-1012 | 0.25 | 0.25 | 0.25 | 0.25 | 0.25 | 0.25 | 0.25 | 0.25 |
| Irganox ® 1010 | 0.15 | 0.15 | 0.15 | 0.15 | 0.15 | 0.15 | 0.15 | 0.15 |

Adhesives RR1 to RR8 were coated using a ChemInstruments HLCL-1000 hot melt coater and laminator onto Akrosil SBL80SC Silox FIU/O thermal cure release liner to a thickness of 5 or 1.5 mils. The application temperature required was 49° C. Samples of each film were warmed for 2 minutes in an oven at 50° C. and then immediately UV cured using an Eye Ultraviolet PL-1 portable benchtop UV curing unit. The UV dose was 180 mJ/cm$^2$. The dose was determined by calibration with an EIT UVIMAP hand-held dosimeter supplied by Eye Ultraviolet. After curing, the adhesives were laminated to Pilcher Hamilton 2 mil untreated polyester film and allowed to age at room temperature for 5 to 15 days before testing.

All of the adhesives exhibited excellent cure and PSA properties as shown in Tables 5B and 5C.

Example 6

The pressure senitive adhesives shown in Table 6A were prepared by simple mixing according to the method of example 2. These adhesives use different relative ratios of epoxidized Polymer 3 to mono-ol Polymer 4, and use several levels of tackifier resin Arkon P90.

TABLE 6A

| | Pressure Senisitive Ahesives | | | | | | | |
|---|---|---|---|---|---|---|---|---|
| | AP1 wt. % | AP2 | AP3 | AP4 | AP5 | AP6 | AP7 | AP8 |
| Polymer 3 | 22.71 | 18.92 | 15.14 | 29.88 | 19.92 | 37.05 | 30.88 | 24.70 |
| Polymer 4 | 37.05 | 30.88 | 24.70 | 29.88 | 19.92 | 22.71 | 18.92 | 15.14 |

TABLE 5B

PSA Properties at 5 mils of Adhesive

| | RR1 | RR2 | RR3 | RR4 | RR5 | RR6 | RR7 | RR8 |
|---|---|---|---|---|---|---|---|---|
| Polymer gel content, % | 85 | 90 | 82 | 92 | 95 | 95 | 96 | 98 |
| Rolling ball tack, cm | 1.1 | 3.1 | >11 | 1.4 | >11 | 1.9 | 7.0 | >11 |
| Loop tack, pli | 4.7 | 6.9 | 9.5 | 4.2 | 7.6 | 3.9 | 6.3 | 3.4 c |
| Probe tack, Kg | 0.86 | 1.31 | 1.61 | 0.74 | 1.62 | 0.62 | 1.33 | 1.58 |
| 180° peel from stainless steel | 3.5 | 4.9 | 9.6 | 2.6 | 9.6 | 2.5 | 4.7 | 8.6 |
| 180° peel from glass | 2.9 | 4.6 | 7.7 | 2.3 | 7.8 | 2.6 | 4.5 | 6.2 |
| 180° peel from polymethylmethacrylate | 3.6 | 4.8 | 6.9 | 2.6 | 9.3 | 2.6 | 4.6 | 7.4 |
| 180° peel from polycarbonate | 3.3 | 4.8 | 6.6 | 2.6 | 8.0 | 2.8 | 4.5 | 6.7 |
| 180° peel from high density polyethylene | 1.2 | 2.2 | 5.2 | 0.6 | 5.2 | 0.4 | 1.8 | 1.4 |
| 23° C. holding power to stainless steel, 1 in$^2$ * 2 Kg, hour | >114 | 48 | 97 | >114 | >114 | >160 | >160 | >160 |
| 95° C. holding power to stainless steel, 1 in$^2$ * 500 g, hour | >160 | >160 | >160 | >160 | >160 | >160 | >160 | >160 |
| Shear Adhesion Failure Temperature to stainless steel, 1 in$^2$ * 500 g, hour | 204 | 192 | 159 | >204 | 153 | >204 | >204 | >204 | c is cohesive splitting of the film.

TABLE 5C

PSA Properties at 1.5 mils of Adhesive

| | RR1 | RR2 | RR3 | RR4 | RR5 | RR6 | RR7 | RR8 |
|---|---|---|---|---|---|---|---|---|
| Polymer gel content, % | 83 | 87 | 71 | 84 | 87 | 95 | 87 | 94 |
| Rolling ball tack, cm | 4.1 | >11 | >11 | 5.5 | >11 | 6.7 | >11 | >11 |
| Loop tack, pli | 3.0 | 5.0 | 6.5 | 2.5 | 1.4 | 2.9 | 5.1 | 0.7 |
| Probe tack, Kg | 0.77 | 0.79 | 1.13 | 0.51 | 0.76 | 0.47 | 0.58 | 0.57 |
| 180° peel from stainless steel | 2.2 | 4.4 | 7.1 c | 2.3 | 6.1 | 2.1 | 3.5 | 2.4 |
| 180° peel from glass | 2.2 | 3.1 | 6.4 c | 1.8 | 2.1 c | 1.6 | 3.6 | 1.8 |
| 180° peel from polymethylmethacrylate | 3.0 | 3.7 | 6.5 c | 2.2 | 6.8 c | 2.3 | 3.6 | 1.9 |
| 180° peel from polycarbonate | 1.4 | 4.2 | 6.3 c | 2.3 | 3.5 | 2.2 | 3.7 | 1.5 |
| 180° peel from high density polyethylene | 0.5 | 1.3 | 3.1 | 0.2 | 1.0 | 0.1 | 1.0 | 0.8 |
| 23° C. holding power to stainless steel, 1 in$^2$ * 2 Kg, hour | >118 | >118 | >118 | >118 | >114 | >114 | >114 | >114 |
| 95° C. holding power to stainless steel, 1 in$^2$ * 500 g, hour | >112 | >112 | >112 | >160 | >160 | >160 | >160 | >160 |
| Shear Adhesion Failure Temperature to stainless steel, 1 in$^2$ * 500 g, hour | >204 | >204 | 200 | >204 | >204 | >204 | >204 | >204 | c is cohesive splitting of the film.

TABLE 6A-continued

Pressure Senisitive Ahesives

| | AP1 wt. % | AP2 | AP3 | AP4 | AP5 | AP6 | AP7 | AP8 |
|---|---|---|---|---|---|---|---|---|
| Arkon ® P90 | 39.84 | 49.80 | 59.76 | 39.84 | 59.76 | 39.84 | 49.8 | 59.76 |
| SarCat CD-1012 | 0.25 | 0.25 | 0.25 | 0.25 | 0.25 | 0.25 | 0.25 | 0.25 |
| Irganox ® 1010 | 0.15 | 0.15 | 0.15 | 0.15 | 0.15 | 0.15 | 0.15 | 0.15 |

Adhesives AP1 to AP8 were coated using a ChemInstruments HLCL-1000 hot melt coater and laminator onto Akrosil SBL80SC Silox FIU/O thermal cure release liner to a thickness of 5 mils. The application temperature required was 49° C. Samples of each film were warmed for 2 minutes in an oven at 50° C. and then immediately UV cured using an Eye Ultraviolet PL-1 portable benchtop UV curing unit. The UV dose was 180 mJ/cm$^2$. After curing, the adhesives were laminated to Pilcher Hamilton 2 mil untreated polyester film and allowed to age at room temperature for 5 to 15 days before testing.

All of the adhesives exhibited excellent cure and PSA properties as shown in Table 6B.

TABLE 6B

PSA Properties at 5 mils of Adhesive

| | AP1 | AP2 | AP3 | AP4 | AP5 | AP6 | AP7 | A8 |
|---|---|---|---|---|---|---|---|---|
| Polymer gel content, % | 88 | 86 | 85 | 94 | 95 | 96 | 97 | 93 |
| Rolling ball tack, cm | 1.2 | 5.4 | >11 | 1.7 | >11 | 2.8 | >11 | >11 |
| Loop tack, pli | 4.8 | 7.7 | 5.4 c | 3.8 | 1.5 c | 4.1 | 4.2 | 0.4 |
| Probe tack, Kg | 0.82 | 1.30 | >1.64 | 0.75 | 1.44 | 0.66 | 1.06 | 0.32 |
| 180° peel from stainless steel | 3.3 | 5.3 | 9.4 | 2.8 | 7.0 | 2.6 | 4.4 | 5.3 |
| 180° peel from glass | 3.0 | 5.4 | 7.7 | 2.7 | 2.5 | 2.2 | 4.6 | 1.7 |
| 180° peel from polymethylmethacrylate | 3.4 | 5.7 | 7.0 | 3.2 | 7.8 | 2.6 | 4.3 | 6.3 |
| 180° peel from polycarbonate | 3.2 | 6.0 | 6.8 | 3.0 | 7.2 | 2.9 | 4.2 | 5.7 |
| 180° peel from high density polyethylene | 1.2 | 2.7 | 5.7 | 0.7 | 1.0 | 0.4 | 2.1 | 0.4 |
| 23° C. holding power to stainless steel, 1 in$^2$ * 2 Kg, hour | 82 | 93 | >118 | >118 | >118 | >118 | >118 | >118 |
| 95° C. holding power to stainless steel, 1 in$^2$ * 500 g, hour | >117 | >117 | >112 | >112 | >112 | >112 | >112 | >112 |
| Shear Adhesion Failure Temperature to stainless steel, 1 in$^2$ * 500 g, hour | >204 | 172 | 136 | >204 | 153 | >204 | >204 | 193 | c is cohesive splitting of the film.

Example 7

10 gallons of PSA formulation PL1 was made using the stirrer method.

TABLE 7A

Pressure Sensitive Adhesive

| Ingredient | % by weight |
|---|---|
| Polymer 3 (epoxidized polymer) | 19.72 |
| Polymer 5 (mono-ol polymer) | 25.10 |
| Regalite ® 91 | 54.78 |
| SarCat CD-1012 | 0.25 |
| Irganonox ® 1010 | 0.15 |

The PL1 adhesive was continually coated and UV cured on a pilot coater line using a slot die and an Eye Ultraviolet portable unit for cure. The adhesive was slot coated at 80° C. to Akrosil SBL80SSC release liner at a line speed of 30 feet per minute and irradiated with a dose of 250 mJ/cm$^2$. 2 mil corona treated polyester film was then continually laminated to the UV cured adhesive, the laminate was rewourd, and stored at room temperature. A portion of the adhesive lalminate was coated with 5.0 mils of PL1 and a second portion was coated with 1.5 mils. One week after coating, the adhesive was tested for properties.

TABLE 7B

Adhesive Properties

| Test: | 5 mils | 1.5 mils |
|---|---|---|
| Polymer gel content, % | 78 | 79 |
| Loop tack, pli | 7.9 | 6.0 |
| Probe tack, Kg | 2.1 | 0.8 |
| 180° peel from stainless steel | 5.6 | 5.3 |
| 23° C. holding power to stainless steel, 1 in$^2$ * 2 Kg, hour | >720 | >720 |
| 95° C. holding power to stainless steel, 1 in$^2$ * 500 g, hour | >120 | >120 |
| Shear Adhesion Failure Temperature to stainless steel, 1 in$^2$ * 500 g, hour | >168 | >168 |

4 months after coating, the 5 mil adhesive was tested for 180° peel to various substrates, including the difficult to bond thermoplastic polyolefin. Execllent results were obtained from the adhesive as shown in Table 7C.

TABLE 7C

180° Peel Results

| Substrate | Peel, pli |
|---|---|
| Polymethymethacrylate | 5.4 |
| Polypropylene | 5.5 |
| High density polyethylene | 2.8 |
| Polycarbonate | 5.5 |
| Glass | 5.1 |
| Stainless steel | 5.2 |
| DEFLEX 880 thermoplastic polyolefin | 4.6 |
| HIMONT RTA 3263 thermoplastic polyolefin | 5.4 |

We claim:

1. A process for producing a UV curable adhesive or sealant composition which does not utilize a non-aqueous solvent comprising a monohydroxylated epoxidized polydiene polymer comprised of at least two different polymerizable ethylenically unsaturated hydrocarbon monomers wherein at least one is a diene monomer which yields unsaturation suitable for epoxidation, and wherein the polymer contains from 0.1 to 7.0 milliequivalents of epoxy per gram of polymer, a low molecular weight polydiene mono-ol, a photoinitiator, and a tackifying resin which is compatible with the photoinitiator, said process comprising mixing the polymer, mono-ol, and tackifying resin together with a photoinitiator selected from the group consisting of diaryl salts characterized by the general formula:

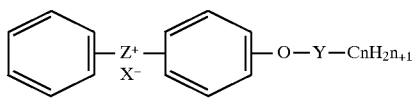

where Y is

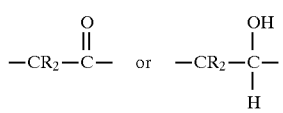

where R is hydrogen, aryl, alkyl, or an alkylhalide; n is an integer of at least 1, Z is I, Cl, or Br, and X is a complex metal halide anion or a complex halide anion of a strong protonic acid.

2. The process of claim 1 wherein the monohydroxylated epoxidized polymer has the formula

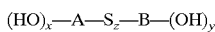

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1, and z is 0 or 1.

3. The process of claim 2 wherein the A blocks have a number average molecular weight of from 100 to 6000 and the B blocks have a number average molecular weight of from 1000 to 15,000.

4. The process of claim 2 wherein A is isoprene, B is butadiene, and S is styrene.

5. The process of claim 1 wherein the epoxidized monohydroxylated polydiene polymer has the formula (HO)$_x$—A—B—S—(OH)$_y$ wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1.

6. The process of claim 5 wherein the A blocks have a number average molecular weight of from 100 to 6000 and the B blocks have a number average molecular weight of from 1000 to 15,000.

7. The process of claim 6 wherein A is isoprene, B is butadiene, and S is styrene.

8. The process of claim 1 wherein the photoinitiator is the diaryliodonium hexafluoroantimonate of the formula:

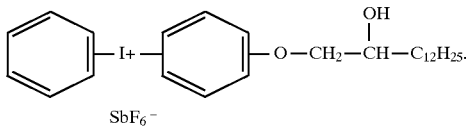

9. A UV curable adhesive or sealant composition comprising a monohydroxylated epoxidized polydiene polymer comprised of at least two different polymerizable ethylenically unsaturated hydrocarbon monomers wherein at least one is a diene monomer which yields unsaturation suitable for epoxidation, and wherein the polymer contains from 0.1 to 7.0) milliequivalents of epoxy per gram of polymer, a low molecular weight polydiene mono-ol, a photoinitiator, and a tackifying resin which is compatible with the photoinitiator, said photoinitiator selected from the group consisting of diaryl salts characterized by the general formula:

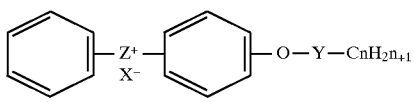

where Y is

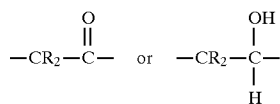

where R is hydrogen, aryl, alkyl, or an alkylhalide; n is an integer of at least 1, Z is I, Cl, or Br, and X is a complex metal halide anion or a complex halide anion of a strong protonic acid.

10. The composition of claim 9 wherein the monohydroxylated epoxidized polymer has the formula (HO)$_x$—A—S$_z$—B—(OH)$_y$ wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1, and z is 0 or 1.

11. The composition of claim 10 wherein the A blocks have a number average molecular weight of from 100 to 6000 and the B blocks have a number average molecular weight of from 1000 to 15,000.

12. The composition of claim 10 wherein A is isoprene, B is butadiene, and S is styrene.

13. The composition of claim 9 wherein the epoxidized monohydroxylated polydiene polymer has the formula (HO)$_x$—A—B—S—(OH)$_y$ wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1.

14. The composition of claim 13 wherein the A blocks have a number average molecular weight of from 100 to 6000 and the B blocks have a number average molecular weight of from 1000 to 15,000.

15. The composition of claim 14 wherein A is isoprene, B is butadiene, and S is styrene.

16. The composition of claim 9 wherein the photoinitiator is the diaryliodonium hexafluoroantimonate of the formula:

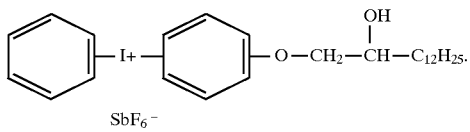

17. A process for producing a UV curable coating composition which does not utilize a non-aqueous solvent comprising a monohydroxylated epoxidized polydiene polymer comprised of at least two different polymerizable ethylenically unsaturated hydrocarbon monomers wherein at least one is a diene monomer which yields unsaturation suitable for epoxidation, and wherein the polymer contains from 0.1 to 7.0 milliequivalents of epoxy per gram of polymer, said process comprising mixing the polymer with a photoinitiator selected from the group consisting of diaryl salts characterized by the general formula:

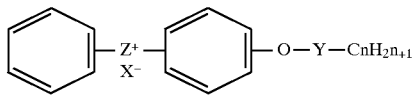

where Y is

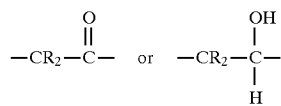

where R is hydrogen, aryl, alkyl, or an alkylhalide; n is an integer of at least 1, Z is I, Cl, or Br, and X is a complex metal halide anion or a complex halide anion of a strong protonic acid.

18. The process of claim 17 wherein the photoinitiator is the diaryliodonium hexafluoroantimonate of the formula:

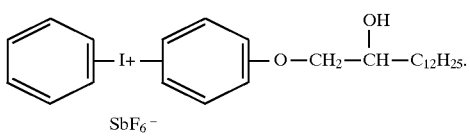

19. A UV curable coating composition comprising a monohydroxylated epoxidized polydiene polymer comprised of at least two different polymerizable ethylenically unsaturated hydrocarbon monomers wherein at least one is a diene monomer which yields unsaturation suitable for epoxidation, and wherein the polymer contains from 0.1 to 7.0 milliequivalents of epoxy per gram of polymer, said photoinitiator selected from the group consisting of diaryl salts characterized by the general formula:

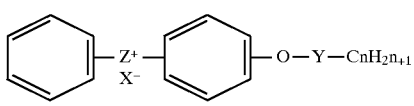

where Y is

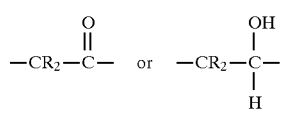

where R is hydrogen, aryl, alkyl, or an alkylhalide; n is an integer of at least 1, Z is I, Cl, or Br, and X is a complex metal halide anion or a complex halide anion of a strong protonic acid.

20. The composition of claim 19 wherein the photoinitiator is the diaryliodonium hexafluoroantimonate of the formula:

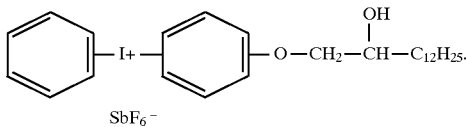

* * * * *